United States Patent
Mais et al.

(10) Patent No.: US 8,978,455 B2
(45) Date of Patent: Mar. 17, 2015

(54) SENSOR DEVICE FOR DETECTING AT LEAST ONE FLOW PROPERTY OF A FLUID MEDIUM

(71) Applicants: Torsten Mais, Ludwigsburg (DE); Ulrich Wagner, Munich (DE); Andreas Kaufmann, Sontheim an der Brenz (DE)

(72) Inventors: Torsten Mais, Ludwigsburg (DE); Ulrich Wagner, Munich (DE); Andreas Kaufmann, Sontheim an der Brenz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/133,259

(22) Filed: Dec. 18, 2013

(65) Prior Publication Data
US 2014/0174166 A1    Jun. 26, 2014

(30) Foreign Application Priority Data

Dec. 20, 2012    (DE) .................. 10 2012 224 049

(51) Int. Cl.
*F02D 41/18*    (2006.01)
*G01F 1/684*    (2006.01)

(52) U.S. Cl.
CPC ............... *F02D 41/18* (2013.01); *G01F 1/684* (2013.01); *F02D 41/187* (2013.01)
USPC ................... 73/114.32; 73/202.5; 73/204.11; 73/204.22; 73/204.21

(58) Field of Classification Search
USPC ............... 73/114.32, 202.5, 204.11, 204.21, 73/204.22
See application file for complete search history.

(56) References Cited

U.S. PATENT DOCUMENTS

| | | | | |
|---|---|---|---|---|
| 4,317,365 | A * | 3/1982 | Lauterbach | 73/204.21 |
| 6,079,264 | A * | 6/2000 | Yamakawa et al. | 73/204.26 |
| 6,148,663 | A * | 11/2000 | Stahl et al. | 73/114.34 |
| 6,272,920 | B1 * | 8/2001 | Tank et al. | 73/204.22 |
| 6,422,070 | B2 * | 7/2002 | Reymann et al. | 73/114.34 |
| 6,557,408 | B1 * | 5/2003 | Mueller et al. | 73/202.5 |
| 6,786,089 | B2 * | 9/2004 | Goto et al. | 73/204.21 |
| 7,313,954 | B2 * | 1/2008 | Kouno et al. | 73/202.5 |
| 7,654,134 | B2 * | 2/2010 | Enomoto et al. | 73/114.32 |
| 7,665,351 | B2 * | 2/2010 | Kamiya | 73/114.32 |
| 7,946,158 | B2 * | 5/2011 | Enomoto et al. | 73/114.32 |
| 8,590,368 | B2 * | 11/2013 | Kitahara | 73/114.32 |
| 8,714,000 | B2 * | 5/2014 | Sudou | 73/114.32 |
| 8,733,159 | B2 * | 5/2014 | Tsujii | 73/114.32 |
| 8,756,989 | B2 * | 6/2014 | Goka et al. | 73/204.26 |

FOREIGN PATENT DOCUMENTS

| | | |
|---|---|---|
| DE | 44 26 102 | 1/1996 |
| DE | 103 45 584 | 4/2005 |

* cited by examiner

*Primary Examiner* — Freddie Kirkland, III
(74) *Attorney, Agent, or Firm* — Kenyon & Kenyon LLP

(57) ABSTRACT

A sensor device for detecting a flow property of fluid medium, e.g., an air flow in the intake tract or the charge air tract of an internal combustion engine, includes: a sensor housing introduced into the air flow and having at least one housing body, at least one cover, and at least one channel through which the fluid medium flows; a sensor element for detecting the flow property, the sensor element being held on a top side of a carrier. The carrier is situated at least partially in the channel and has a cross section which becomes wider in parallel with the main flow direction of the fluid medium at the location of the sensor element in a sectional plane in parallel to the main flow direction of the fluid medium in the channel.

10 Claims, 2 Drawing Sheets

SENSOR DEVICE FOR DETECTING AT LEAST ONE FLOW PROPERTY OF A FLUID MEDIUM

BACKGROUND OF THE INVENTION

1. Field of the Invention

The present invention relates to a sensor device for detecting at least one flow property of a fluid medium, e.g., in the intake tract or the charge tract of an internal combustion engine.

2. Description of the Related Art

Flow meters are used to ascertain the air flow in the intake tract or the charge tract of an internal combustion engine. Since the weight ratios are important in the chemical process of combustion, the mass flow rate of the intake/charge air is to be measured, for which volume measuring methods or impact pressure measuring methods are used to some extent.

Various types of sensors are known for measuring the air mass throughput. One such type of sensor is the so-called hot-film mass airflow sensor, such as that described in one possible specific embodiment in published German patent application document DE 103 45 584 A1. The flow meter according to published German patent application document DE 103 45 584 A1 has a sensor housing having a cavity for accommodating an electronic module, which is separated from a bypass measuring channel. The electronic module here has a carrier profile, which is formed essentially on a bottom plate having side webs molded on the opposing longitudinal sides. The electronic module also has a plastic carrier tongue, which is situated on one of the head sides of the carrier profile and, as a carrier, accommodates the sensor element. A circuit board equipped with electronic components and printed conductors is usually attached to the bottom plate of the carrier profile to provide an evaluating electronic unit.

Published German patent application document DE 103 45 584 A1 also describes how the electronic module is held by the side webs in the cavity provided here after being inserted into the sensor housing, while achieving a clamping effect. The carrier here protrudes into the bypass measuring channel through an outlet opening between the latter and this cavity.

In addition, published German patent application document DE 44 26 102 A1 describes a sensor carrier for a device for measuring the mass of a flowing medium, which is characterized in that the sensor carrier has a frame element and a holding element, the frame element having an opening which is covered by the holding element situated at the rear, thereby forming the recess for the sensor element.

BRIEF SUMMARY OF THE INVENTION

The present invention provides a sensor device for detecting at least one flow property of a fluid medium, in particular for detecting the air flow rate in the intake tract or the charge air tract of an internal combustion engine. The sensor device has at least one sensor housing, which may be introduced into the fluid medium and has at least one housing body and at least one cover. In addition, the sensor housing preferably has at least one channel through which the fluid medium may flow. In addition, the sensor device has a sensor element for detecting the flow property of the fluid medium, which is preferably mounted on a top side of a carrier, the carrier having a bottom side opposite the top side. The carrier is preferably situated at least partially in the channel. The channel may also be a side channel or a bypass channel branching off from a main flow channel or a main channel.

With the sensor device according to the present invention, it is also provided that, at the location of the sensor element in a sectional plane parallel to a main flow direction of the fluid medium in the channel, the carrier has a cross section which becomes wider in at least some sections parallel to the main flow direction of the fluid medium. In other words, the thickness of the carrier increases along the main flow direction and decreases, preferably steadily, opposite the main flow direction accordingly. Furthermore, it is important in particular that the cross section becomes wider in the main flow direction, at least up to the rear of the sensor element.

With the resulting tapering or constriction of the measuring channel, preferably steadily, in particular upstream from and in the area of the sensor element, it has advantageously been found that it is possible in this way to have an effective influence on the oncoming flow of the fluid medium against the sensor element and thereby substantially improve the stability, in particular the reproducibility, of the measurements, the comparability and signal-to-noise ratio. In this context, it is desirable in particular that an equally steady increase in the velocity of the fluid medium is achieved due to this steady tapering of the measuring channel, thus also improving the advantages mentioned above.

In addition, the dependence of the comparability of the positioning of the housing body, of the cover and of the carrier in relation to one another is reduced in an advantageous manner, which permits a higher precision of the sensor devices compared and decreases rejects due to the production technology accordingly in an advantageous manner with the same manufacturing tolerances. As has also been found here, the influence of the position of the cover and the housing body is reduced significantly because the sensor element in particular is positioned on the carrier and the carrier contributes significantly toward the tapering of the channel. It is conceivable here in particular that complete independence of the position of the cover and the housing body is achieved when tapering of the channel is implemented completely by the carrier. Due to the widening of the cross section of the carrier according to the present invention and the associated tapering of the channel, in particular a reduction in the cross section of the channel, the flow velocity and the pressure of the fluid medium are influenced in the area of the sensor element and therefore an increase in accuracy is possible in an advantageous manner.

It may also be advantageous if the carrier is designed to be wedge-shaped in at least some sections at the location of the sensor element. A corresponding wedge shape of the carrier thus also has advantageous effects in the manner described above by a widening of the cross section of the carrier and a corresponding tapering of the cross section of the channel.

According to the idea on which the present invention is based, it may also be provided that the carrier has an inflow edge, in particular a contoured inflow edge. In other words, the inflow edge preferably has a fluidically optimized contour, the inflow edge having a contour having a shape starting from a tip or an apex point—as viewed in the main flow direction of the fluid medium—such that the cross section of the carrier also widens increasingly in the main flow direction of the fluid medium in the area of the inflow edge starting from the tip of the carrier.

According to another specific embodiment of the present invention, it may be provided that the carrier of the sensor device has an apex angle $\gamma$, as viewed in the main flow direction. This apex angle is defined in particular by the two straight lines spanning the apex angle, these lines being obtained by drawing two lines in tangent to both the top side and the bottom side of the carrier. These two straight lines usually intersect in front of the carrier, as viewed in the main flow direction. "Drawing a tangent" is understood here in particular to mean that the straight line does not pass through the cross-sectional area of the carrier but instead merely contacts the carrier, under formation of one or multiple contact points.

In addition, it may advantageously be provided that the carrier of the sensor device has a recess on the top side, the sensor element being introduced into the recess in such a way that the measuring surface of the sensor element has fluid medium flowing over it. It may also advantageously be provided that the sensor element completely fills up the recess and the measuring surface is flush with the top side of the carrier.

The measuring surface may be equipped, for example, with at least one heating element and at least two temperature sensors, the sensor device optionally being equipped, for example, to detect, with the aid of the temperature sensors, an influence on a temperature distribution due to the flow of the fluid medium. For this purpose, one temperature sensor is preferably situated, viewed in the flow direction of the fluid medium, upstream and one temperature sensor is situated downstream from the heating element.

According to another embodiment of the proposed sensor device, it may be provided that at least the bottom side and/or the top side of the carrier has/have a planar shape in at least some sections.

Alternatively or additionally, it may also be provided that at least the bottom side and/or the top side of the carrier has/have a shape which is concave and/or convex, in particular being curved in at least some sections.

This advantageously creates the possibility of having an advantageous influence on the flow of the fluid medium through a corresponding design of a surface contour on the bottom side and/or the top side of the carrier.

In addition, with the proposed sensor device, it may also be provided that at least on the bottom side and/or the top side of the carrier two or more regions of a different shape abut in pairs, forming a transitional edge.

The design of the carrier is not limited to symmetrical or conical geometries in particular. Consequently, a variety of possible designs of the shape of the bottom side and/or the top side of the carrier are conceivable. With another embodiment of the sensor device in particular, it may be provided that the top side and the bottom side have a shape, which is described in greater detail in the following itemization. In particular, it may be provided here that the top side and the bottom side have a planar shape in at least some sections and the top side runs at a first pitch, preferably >0°, in particular >10°, to the main flow direction, and the bottom side runs at a second pitch, preferably >0°, in particular >10°, to the main flow direction. Furthermore, the first pitch and the second pitch are equal. In general, the pitch refers to the angle which is enclosed or spanned in a sectional plane by a vector of the main flow direction in the area of the carrier and a vector tangentially along the shape of either the top side or the bottom side of the carrier or a wall section of the housing body or of the cover.

Alternatively, the shape of the top side and the bottom side may be designed in such a way that the top side and the bottom side each have a planar shape in at least some sections, the top side running at a first pitch, preferably >0°, in particular >10°, to the main flow direction, and the bottom side running at a second pitch, preferably >0°, in particular >10°, to the main flow direction, the first pitch and the second pitch being different.

According to another alternative embodiment, it may be provided for the top side and the bottom side to each have a planar shape in at least some sections, the top side running in parallel to the main flow direction, and the bottom side running at a second pitch, preferably >0°, in particular >10°, to the main flow direction.

Conversely, it may likewise be provided that the top side and the bottom side each have a planar shape in at least some sections, the top side running at a first pitch, preferably >0°, in particular >10°, to the main flow direction, and the bottom side running in parallel to the main flow direction.

It is likewise conceivable that the top side has a shape with a concave curvature in at least some sections. A concave shape is understood in particular to mean that the curvature bulges centrally toward a straight sectional line running essentially in parallel to the main flow direction through the carrier. In other words, the cross-sectional area of the carrier is reduced by the concave curvature, whereas it would increase due to a convex curvature having the same edge points of the curvature.

It may likewise correspondingly be provided that the bottom side has a concave curvature in at least some sections.

In addition, it is possible to design the shape of the carrier in such a way that the bottom side has a first section having a first shape in the main flow direction and a second section having a second shape connected to the first section in the main flow direction, a transitional edge being situated essentially across the main flow direction between the first section and the second section.

The proposed sensor device may also be designed in such a way that the carrier tapers on its downstream end, i.e., at its rear end in the main flow direction, in particular so that the shape of the top side and the shape of the bottom side meet and merge at an apex.

According to another embodiment of the sensor device, it may also be provided that the housing body and/or the cover has/have a geometry in which the housing body and/or the cover is/are designed to cause the channel to taper in the area of the carrier. This yields in particular the advantage that the influence of the carrier on the flow of the fluid medium is advantageously supported by the geometry of the housing body and/or that of the cover.

In addition, it may also be provided that the cross-sectional shape of the carrier is adapted essentially to the geometry of the housing body and/or that of the cover. This means in particular that the shape of the top side of the carrier cooperates with the geometry of the cover in such a way that the flow of the fluid medium between the carrier and the cover may be influenced in a targeted manner. Furthermore, the bottom side of the carrier here also has a shape which cooperates with the geometry of the housing body in particular and seeks to influence the flow of the fluid medium between the bottom side of the carrier and the housing body, optionally in the same way as the flow of the fluid medium between the top side of the carrier and the cover, or to induce a different flow through a different influence.

In general, it may also be provided that the sensor device, in particular the sensor housing of the sensor device, is designed at least partially as a plug sensor, and the plug sensor is introducible into a flow tube of the fluid medium.

DETAILED DESCRIPTION OF THE INVENTION

Figure 1:
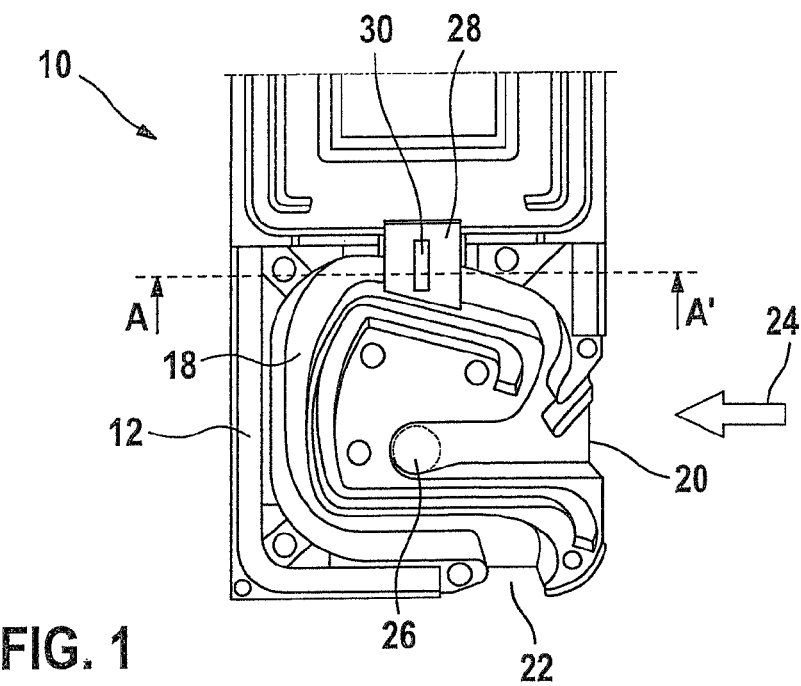
FIG. 1 shows a schematic diagram of the sensor housing of a sensor device according to the present invention without a cover placed on the housing body.

FIG. 1 shows a schematic diagram of one possible specific embodiment of sensor device 10 according to the present invention, which shows in particular a sensor housing 12 having an open housing body 14, in other words, without a cover 16, which is provided for closing housing body 14.

The diagram in FIG. 1 also indicates that a channel 18, which has an inflow opening 20 and an outflow opening 22, is situated in housing body 14. Inflow opening 20 is preferably situated on an end face of housing body 14 directed opposite main flow direction 24, outflow opening 22 preferably at the same time being situated at a right angle to inflow opening 20 within a chamber carrying the fluid medium. In addition, the preferred specific embodiment of sensor device 10 according to the present invention has another outlet opening 26, which is formed following inflow opening 20, as viewed along main flow direction 24. This permits a preferred embodiment of channel 18 as a bypass channel.

As also shown in FIG. 1, sensor device 10 has a carrier 28 situated in channel 18 in at least some sections, a sensor element 30 being held on this carrier inside channel 18. It may thus be ensured that a substream of the fluid medium flows along main flow direction 24 through inflow opening 20 following the course of channel 18 to outflow opening 22 and flows over carrier 28 and sensor element 30.

Figure 2:
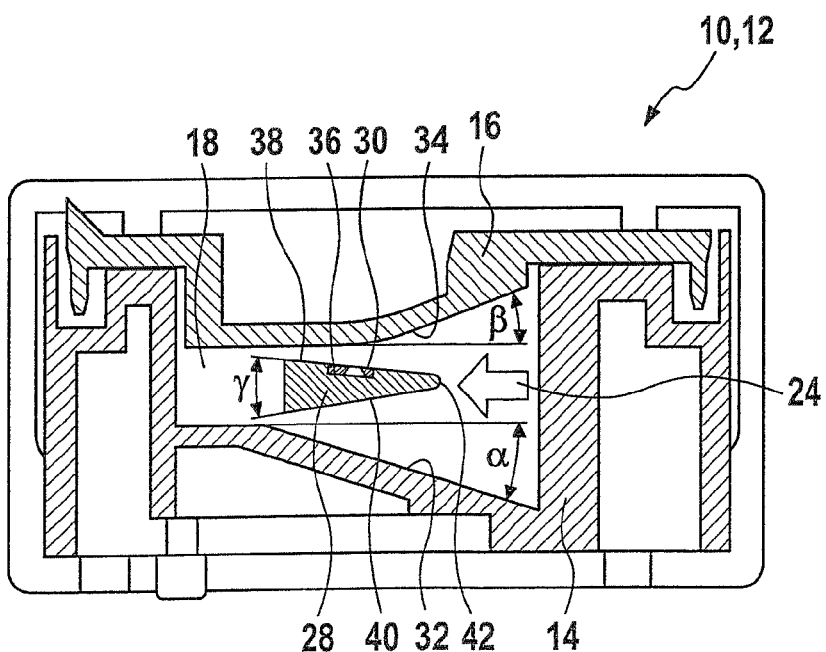
FIG. 2 shows a sectional diagram of a possible specific embodiment along line A-A' in FIG. 1.

FIG. 2 shows a sectional diagram of one possible specific embodiment along line A-A' as shown in FIG. 1.

The diagram in FIG. 2 shows in particular that housing body 14 has a pitch α which reduces the cross section of channel 18 in front of and in the area of carrier 28. In addition, cover 16 has a pitch β which may be designed to be different from pitch α of housing body 14, for example, as shown here, and influences the cross section of channel 18 only in an area in front of carrier 28. Geometry 32 of housing body 14 is described by the wall section of housing body 14 with pitch α as well as the wall section in channel 18 adjacent thereto and aligned in parallel to main flow direction 24. A corresponding geometry 34 of cover 16 is described by the wall section of cover 16, which runs at pitch β in some sections, and the section of cover 16 runs adjacent thereto downstream and essentially in parallel to main flow direction 24.

FIG. 2 also shows that in the specific embodiment of sensor device 10 shown here, sensor element 30 is situated in a recess 36, preferably on top side 38 of carrier 28. Carrier 28 also has a bottom side 40 situated opposite top side 38. The shape of top side 38 and bottom side 40 of carrier 28 shown here form in particular an inflow edge 42 directed opposite main flow direction 24. When viewed in main flow direction 24, the shape of top side 38 and of bottom side 40 of carrier 28 thus contributes to the tapering of channel 18 in accordance with the idea according to the present invention. Carrier 28 here has a apex angle γ, which corresponds to the angle between a straight line applied to top side 38 and to bottom side 40.

Thus, in general, the pressure and/or the flow velocity of the fluid medium may be influenced indirectly by the tapering of channel 18, in particular a reduction in the cross section of channel 18 in the area of carrier 28. As shown in FIG. 2, the flow velocity along top side 38 of carrier 28 may differ from the flow velocity on bottom side 40 of carrier 28, in particular due to the difference in design of geometry 32 of housing body 14 and geometry 34 of cover 16.

Figure 3:
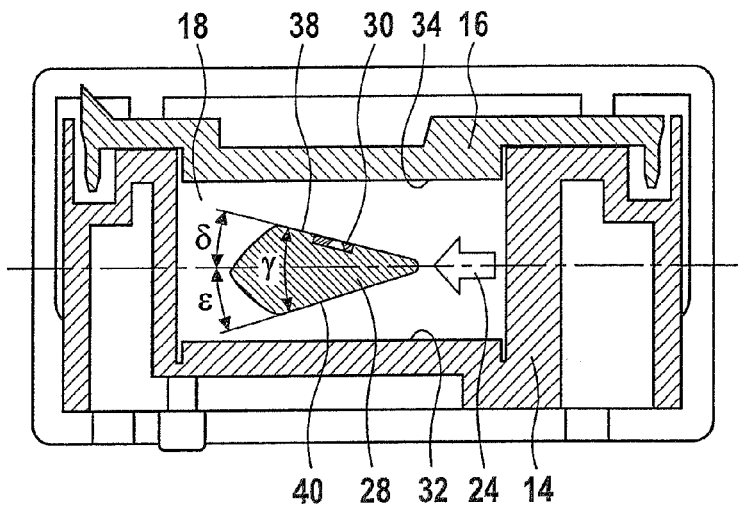
FIG. 3 shows a sectional diagram of another specific embodiment along line A-A' in FIG. 1.

FIG. 3 shows a sectional diagram of another specific embodiment of sensor device 10 along line A-A' in FIG. 1. Sensor device 10 illustrated in FIG. 3 differs from sensor device 10 illustrated in FIG. 2 only in geometry 32 of housing body 14, geometry 34 of cover 16, the design of carrier 28 and the resulting different design of channel 18.

As may be derived in detail from the diagram in FIG. 3, geometry 32 of housing body 14 is formed by a wall section, which is merely planar. At the same time, geometry 34 of cover 16 is formed by a wall section in parallel to main flow direction 24. According to this specific embodiment of sensor housing 12 of sensor device 10, no tapering of channel 18 is achieved by geometry 32 of housing body 14 and geometry 34 of cover 16, when considered alone. The tapering of channel 18, in particular a reduction in the channel cross section, is created exclusively by carrier 28 according to the specific embodiment shown in FIG. 3. Carrier 28 also reveals that apex angle γ is obtained from two partial angles δ, γ, partial angle δ corresponding to the pitch of top side 38 of carrier 28 in relation to main flow direction 24. Accordingly, partial angle ε is formed by the pitch of bottom side 40 of carrier 28 in relation to main flow direction 24.

In addition, the diagram in FIG. 3 indicates that top side 38 of carrier 28 is formed by an area 44 having a planar shape and by an additional area adjacent to area 44 downstream and having a different angle of inclination. Accordingly, a transitional edge 46 is formed on top side 38 of carrier 28 in the transition of the two areas into one another. According to the specific embodiment of sensor device 10 shown in FIG. 3, it may also be provided that top side 38 and bottom side 40 of carrier 28 contact one another in a shared vertex on a side of carrier 28 opposite inflow edge 42 in main flow direction 24. However, it is not absolutely necessary for this vertex to lie on a plane of inflow edge 42, as viewed in main flow direction 24. This may optionally be situated in particular on a side facing top side 38 or bottom side 40 in relation to inflow edge 42 in main flow direction 24 due to an asymmetrical design of top side 38 and bottom side 40 of carrier 28.

In the following individual diagrams a) through f) of FIG. 4, various possible embodiments of carrier 28 are shown, in particular the shape of top side 38 or of bottom side 40. The individual diagrams of different embodiments of carrier 28 are described below essentially on the basis of their differences in comparison with one another, in particular the differences in comparison with the preceding diagram.

FIG. 4a thus shows a carrier 28 having an area 44 of a planar shape provided on top side 38 as well as on bottom side 40 of carrier 28.

FIG. 4b shows a carrier 28, which also has an area 44 having a planar shape on top side 38 as well as on bottom side 40 of carrier 28, but top side 38 of carrier 28 runs essentially in parallel to main flow direction 24 (not shown), whereas bottom side 40 of carrier 28 is set at an angle in relation to main flow direction 24.

However, the diagram in FIG. 4c shows a carrier 28, whose bottom side 40 runs essentially in parallel to main flow direction 24 (not shown), so that top side 38 of carrier 28 has a pitch in relation to main flow direction 24.

Carrier 28 according to the diagram in FIG. 4d has an area 48 having a concave shape on top side 38 as well as on bottom side 40.

However, the diagram in FIG. 4e shows that carrier 28 illustrated here has an area 44 on top side 38 having a planar shape, which runs obliquely to main flow direction 24. Bottom side 40 of carrier 28 illustrated here also has an inclined area 44 having a planar shape, when viewed in main flow direction 24, to which an additional area 44 also having a planar shape but in parallel to main flow direction 24 is connected, forming a transitional edge 46. However, the diagram in FIG. 4f indicates that top side 38 of carrier 28 shown here is formed from an area 48 having a concave shape, whereas bottom side 40 initially also has an area 48 having a concave shape in main flow direction 24, an additional area 50 having a convex shape connected to same, forming a transitional edge 46.

Figure 4:
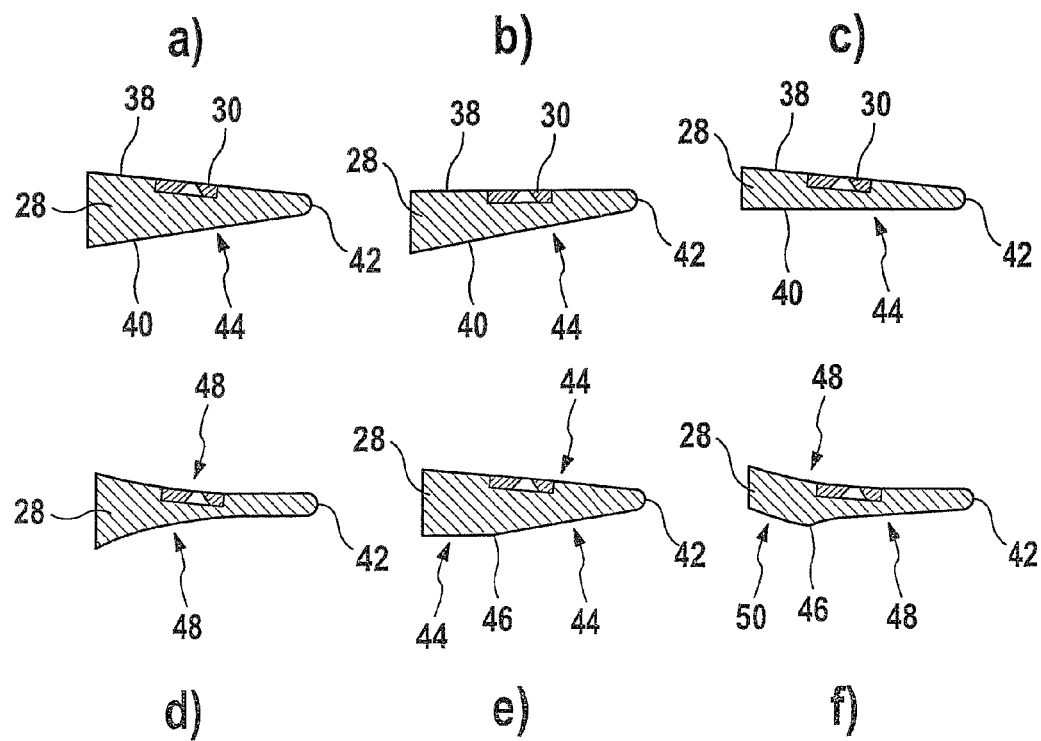
FIGS. 4a through 4f illustrate various diagrams of possible embodiments of the carrier.

The possible embodiments of carrier 28 are not exhausted in the diagrams of FIGS. 2 through 4 but instead may be formed by any combination of different features of top side 38 or bottom side 40 of carrier 28 in planar, convex or concave sections in arbitrary apex angles $\gamma$, in particular pitches $\delta$, $\epsilon$.

What is claimed is:

1. A sensor device for detecting at least one flow property of an air flow in one of an intake tract or a charge air tract of an internal combustion engine, comprising:
    at least one sensor housing introduced into the air flow, the sensor housing having at least one housing body, at least one cover, and at least one channel through which the air flows;
    a sensor element for detecting the at least one flow property, the sensor element being held on a top side of a carrier, the carrier being situated at least partially in the at least one channel, wherein the carrier has a cross section which becomes wider in parallel with a main flow direction of the air flow at the location of the sensor element in a sectional plane in parallel to the main flow direction of the air flow in the channel.

2. The sensor device as recited in claim 1, wherein the carrier has a wedge shape in at least some sections at the location of the sensor element.

3. The sensor device as recited in claim 2, wherein the carrier has an apex angle as viewed in the main flow direction of the air flow.

4. The sensor device as recited in claim 2, wherein the carrier has a contoured inflow edge.

5. The sensor device as recited in claim 2, wherein the carrier has a recess on the top side, the sensor element being introduced into the recess in such a way that the air flows over a measuring surface of the sensor element.

6. The sensor device as recited in claim 2, wherein at least one of a bottom side and the top side of the carrier has a planar shape in at least some sections.

7. The sensor device as recited in claim 2, wherein at least one of a bottom side and the top side of the carrier has at least one of a concave shape and a convex shape in at least some sections.

8. The sensor device as recited in claim 2, wherein two areas having different shapes abut on at least one of a bottom side and the top side of the carrier to form a transitional edge.

9. The sensor device as recited in claim 8, wherein the carrier tapers on a downstream end.

10. The sensor device as recited in claim 2, wherein at least one of the housing body and the housing cover is configured with a geometry which induces a tapering of the channel in the area of the carrier.

* * * * *